US011092146B2

(12) United States Patent
Alexander et al.

(10) Patent No.: US 11,092,146 B2
(45) Date of Patent: Aug. 17, 2021

(54) PUMP WITH SYMMETRICAL MOUNTING HOLES FOR ASYMMETRICAL MOUNTING ARRANGEMENT

(71) Applicant: FNA Group, Inc., Pleasant Prairie, WI (US)

(72) Inventors: Gus Alexander, Inverness, IL (US); Richard J. Gilpatrick, Burlington, WI (US)

(73) Assignee: FNA Group, Inc., Pleasant Prairie, WI (US)

( * ) Notice: Subject to any disclaimer, the term of this patent is extended or adjusted under 35 U.S.C. 154(b) by 0 days.

(21) Appl. No.: 16/749,236

(22) Filed: Jan. 22, 2020

(65) Prior Publication Data

US 2021/0156377 A1    May 27, 2021

Related U.S. Application Data

(60) Provisional application No. 62/939,973, filed on Nov. 25, 2019, provisional application No. 62/939,980, filed on Nov. 25, 2019.

(51) Int. Cl.
*F04B 39/12* (2006.01)
*F04B 53/22* (2006.01)
*F01B 3/00* (2006.01)

(52) U.S. Cl.
CPC ............ *F04B 39/121* (2013.01); *F04B 53/22* (2013.01); *F01B 3/0029* (2013.01)

(58) Field of Classification Search
CPC ...... F04B 53/16; F04B 53/22; F04C 15/0003; F04C 2230/603; F04C 2230/604; B08B 2203/027; B08B 2203/0294
See application file for complete search history.

(56) References Cited

U.S. PATENT DOCUMENTS

| | | | | | |
|---|---|---|---|---|---|
| 5,975,863 | A | * | 11/1999 | Mazzucato | F04B 1/148 417/269 |
| 6,056,515 | A | * | 5/2000 | Cuneo | F04B 1/148 417/271 |
| 6,896,491 | B2 | * | 5/2005 | Trubnikov | F16C 35/04 384/537 |
| 8,007,264 | B2 | * | 8/2011 | Drew | F01C 21/02 418/206.1 |
| 8,475,141 | B2 | * | 7/2013 | DaRif | F04B 1/145 417/271 |
| 8,601,634 | B1 | * | 12/2013 | Stunkard | F16L 55/46 15/104.062 |
| 9,285,040 | B2 | * | 3/2016 | Forrest | F16K 13/04 |
| D823,898 | S | * | 7/2018 | Alexander | D15/7 |
| D823,900 | S | * | 7/2018 | Alexander | D15/7 |
| 2006/0254541 | A1 | * | 11/2006 | Nushart | F04B 1/122 123/41.86 |

* cited by examiner

*Primary Examiner* — Thomas E Lazo
(74) *Attorney, Agent, or Firm* — Steven E. Jedlinski; Jeffrey T. Placker; Holland & Knight LLP

(57) ABSTRACT

A pump includes a pump body. The pump may also include a pump mounting flange configured to mount the pump to an engine flange including four clocked mounting holes. The pump mounting flange may include a first set of four mounting holes corresponding to the four clocked mounting holes in a first orientation. The pump mounting flange may include a second set of four mounting holes corresponding to the four clocked mounting holes in a second orientation.

19 Claims, 13 Drawing Sheets

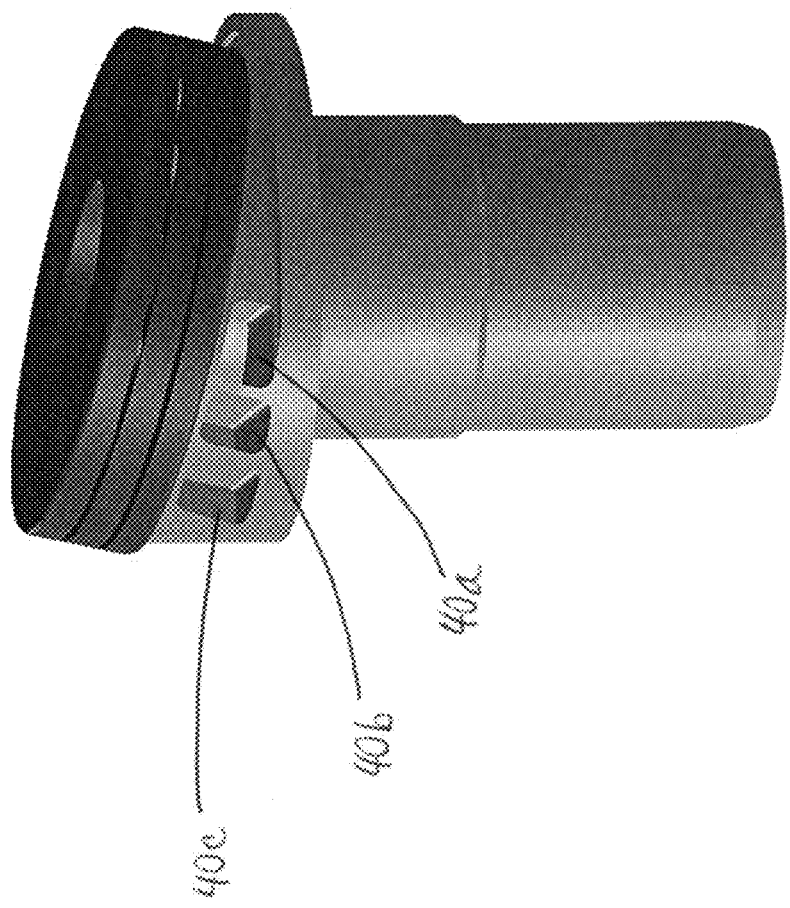

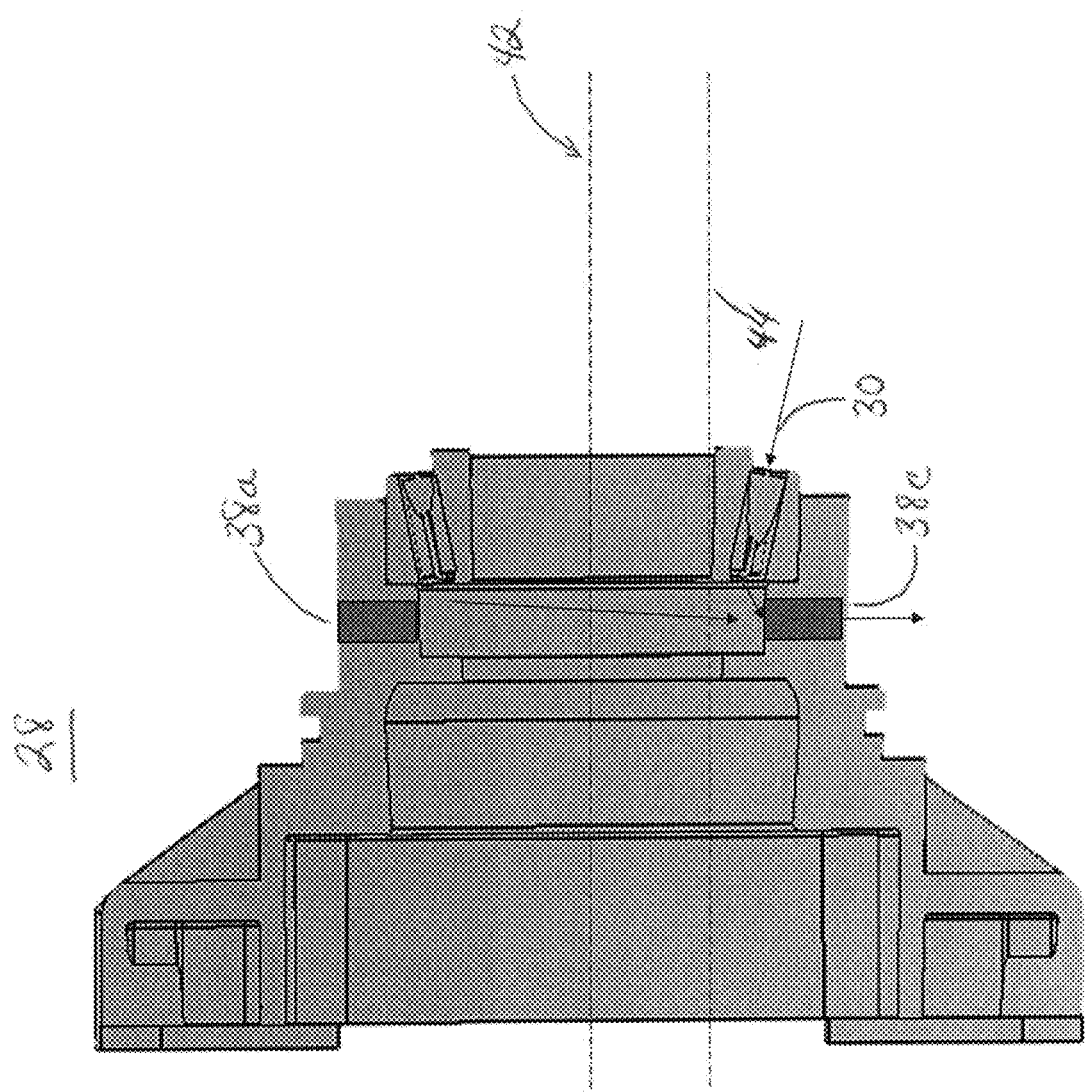

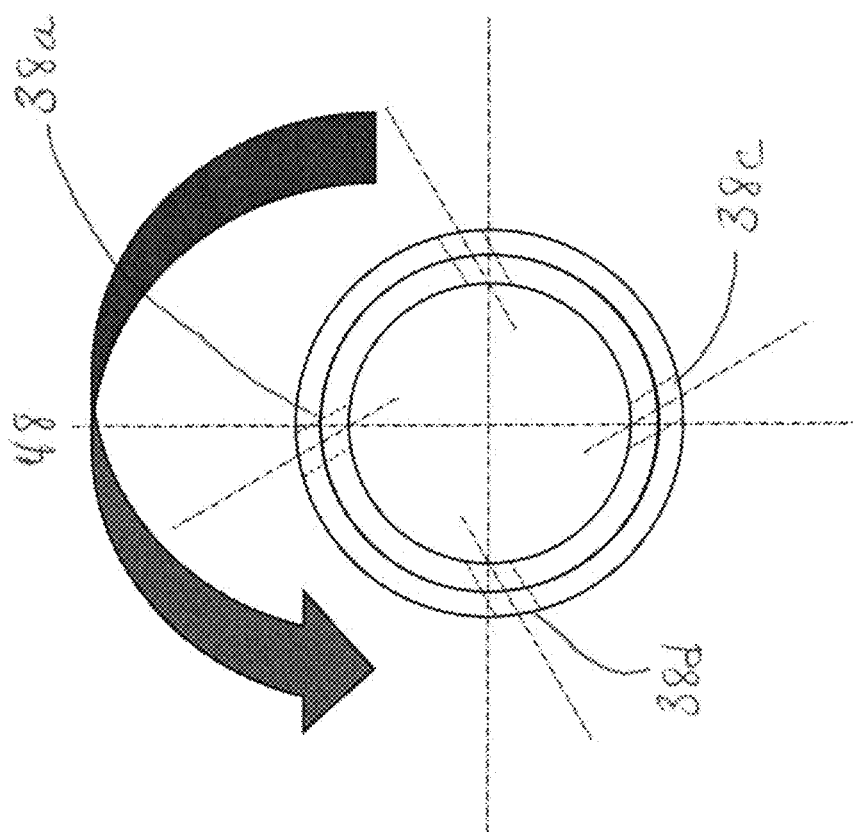

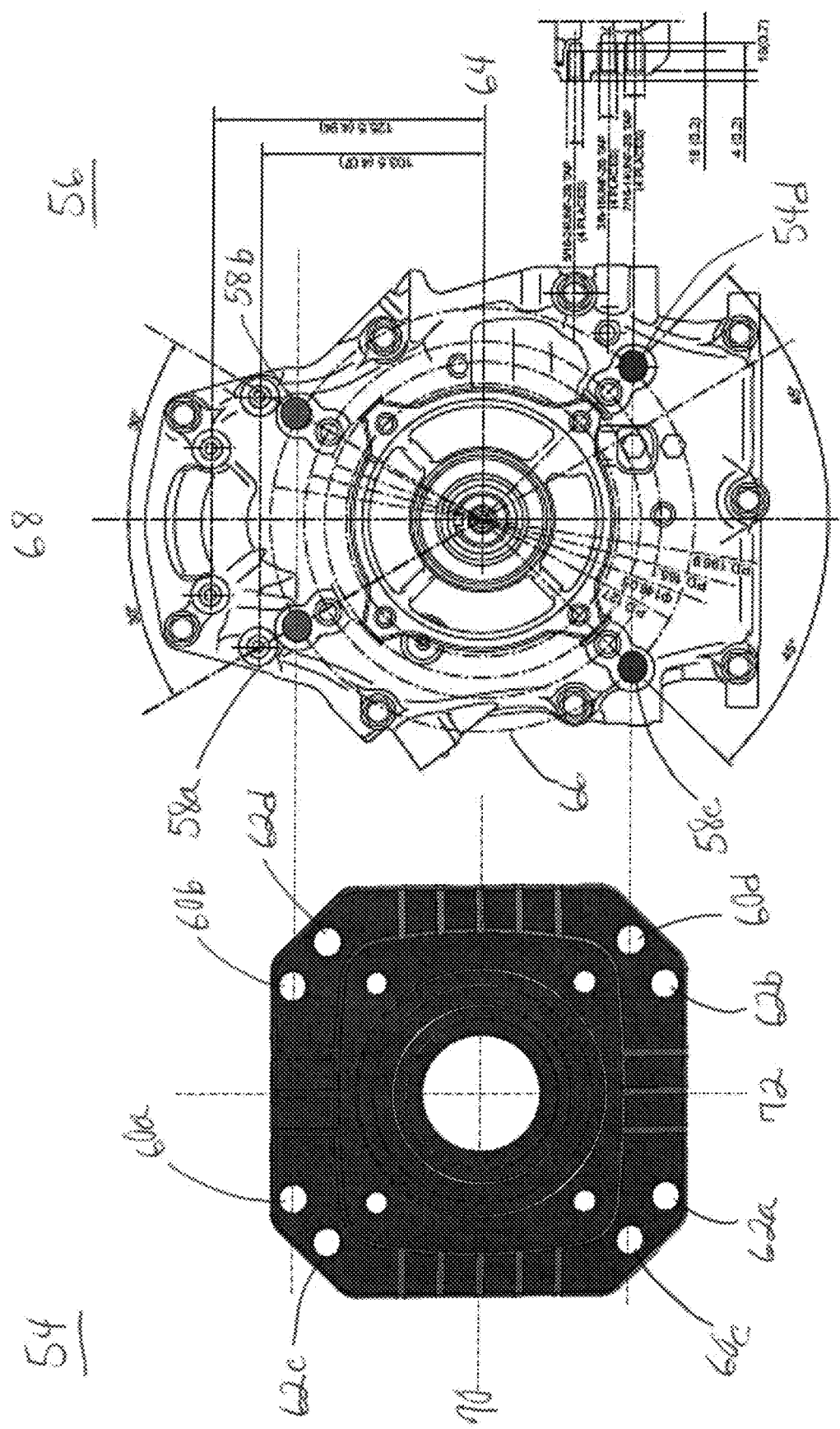

PUMP WITH SYMMETRICAL MOUNTING HOLES FOR ASYMMETRICAL MOUNTING ARRANGEMENT

CROSS-REFERENCE TO RELATED APPLICATIONS

This applications claims the benefit of U.S. provisional application Ser. No. 62/939,973 entitled "Dynamic Lubrication System," filed on 25 Nov. 2019, and U.S. provisional application Ser. No. 62/939,980 entitled "Symmetrical Fastener Pump Mounting Flange for Non-Symmetrical Bolt Pattern," filed on 25 Nov. 2019, the entire contents of both of which are incorporated herein by reference.

TECHNICAL FIELD

The present invention generally relates to pumps, and more particularly relates to mounting arrangements for a pump.

BACKGROUND

Many domestic and commercial water usage applications may require relatively high pressures, which may be beyond the capacity of residential and/or municipal water distribution and supply systems. For example, heavy duty cleaning applications may benefit from increased spraying pressure that is greater than the pressure available from common residential and/or municipal water distribution and supply systems. In some situations, various nozzles may be utilized to constrict the flow of the water to provide an increase in the pressure of the resultant water stream. However, many tasks may benefit from even greater pressures than can be achieved with common pressure nozzles that may be attached to a hose. In such circumstances pressure washers may be utilized, in which a power driven pump may be employed to increase the pressure significantly above pressures that are readily achievable using hose attachments. Such elevated pressures may increase the efficiency and/or effectiveness of some cleaning and spraying tasks.

SUMMARY

According to an implementation, a pump may include a pump body and a pump mounting flange configured to mount the pump to an engine flange including four clocked mounting holes. The pump mounting flange may include a first set of four mounting holes corresponding to the four clocked mounting holes in a first orientation. The pump mounting flange may also include a second set of four mounting holes corresponding to the four clocked mounting holes in a second orientation.

One or more of the following features may be included. The four clocked mounting holes define an asymmetrical arrangement. The four clocked mounting holes may lie on a common mounting circle, with two of the four clocked mounting holes having a first angular spacing relative to a centerline of the mounting circle and two of the four clocked mounting holes having a second angular pacing relative to the centerline of the mounting circle. The first angular spacing may be different than the second angular spacing. The first angular spacing may be about 30 degrees, and the second angular spacing may be about 45 degrees. The first set of mounting holes and the second set of mounting holes may provide a symmetrical pattern across a centerline of an input shaft of the pump.

According to another implementation, a pump may include a cam plate configured to be rotationally driven by an input shaft. The pump may also include a plurality of piston pumps radially spaced around a rotational axis of the cam plate and configured to be reciprocatingly driven by the cam plate. A housing may define a cavity at least partially containing the cam plate and the plurality of piston pumps. The pump may further include a pump mounting flange configured to mount the pump to an engine flange including four clocked mounting holes. The pump mounting flange may include a first set of four mounting holes corresponding to the four clocked mounting holes in a first orientation. The pump mounting flange may further include a second set of four mounting holes corresponding to the four clocked mounting holes in a second orientation.

One or more of the following features may be included. The four clocked mounting holes may define an asymmetrical arrangement. The four clocked mounting holes may lie on a common mounting circle, with two of the four clocked mounting holes having a first angular spacing relative to a centerline of the mounting circle and two of the four clocked mounting holes having a second angular pacing relative to the centerline of the mounting circle. The first angular spacing may be different than the second angular spacing. The first angular spacing may be about 30 degrees, and the second angular spacing may be about 45 degrees. The first set of mounting holes and the second set of mounting holes may provide a symmetrical pattern across a centerline of an input shaft of the pump. The housing may include a breather. The first set of mounting holes and the second set of mounting holes may be configured to allow the breather to be oriented in a desired position during operation of the pump.

According to yet another implementation, a pump may include a housing including a breather. The pump may also include a pump mounting flange configured to mount the pump to an engine flange including four clocked mounting holes. The pump mounting flange may include a first set of four mounting holes corresponding to the four clocked mounting holes in a first orientation. The pump mounting flange may also include a second set of four mounting holes corresponding to the four clocked mounting holes in a second orientation. The first set of mounting holes and the second set of mounting holes may be configured to allow the breather to be oriented in a desired position during operation of the pump.

One or more of the following features may be included. The four clocked mounting holes may define an asymmetrical arrangement. The four clocked mounting holes may lie on a common mounting circle, with two of the four clocked mounting holes having a first angular spacing relative to a centerline of the mounting circle and two of the four clocked mounting holes having a second angular pacing relative to the centerline of the mounting circle. The first angular spacing may be different than the second angular spacing. The first angular spacing may be about 30 degrees. The second angular spacing may be about 45 degrees. The first set of mounting holes and the second set of mounting holes may provide a symmetrical pattern across a centerline of an input shaft of the pump.

The pump may further include a cam plate and at least one piston pump configured to be axially driven when the cam plate is rotationally driven. The housing may define a cavity at least partially surrounding the cam plate and the at least one piston pump. The cavity may further define an oil reservoir. The breather may be in fluid communication with the oil reservoir. The breather may be at least partially defined by an oil fill cap.

BRIEF DESCRIPTION OF THE DRAWINGS

FIG. 9 depicts an illustrative example cam plate and input shaft, consistent with an example embodiment;

FIG. 10 diagrammatically depicts an illustrative example bearing support and bearing, consistent with an example embodiment;

FIG. 11 diagrammatically depicts an illustrative example arrangement of one or more passages of an example bearing support, consistent with an example embodiment;

FIGS. 13A and 13B respectively depict an illustrative example pump mounting flange and engine mounting flange, consistent with an example embodiment.

DETAILED DESCRIPTION

Figure 1:
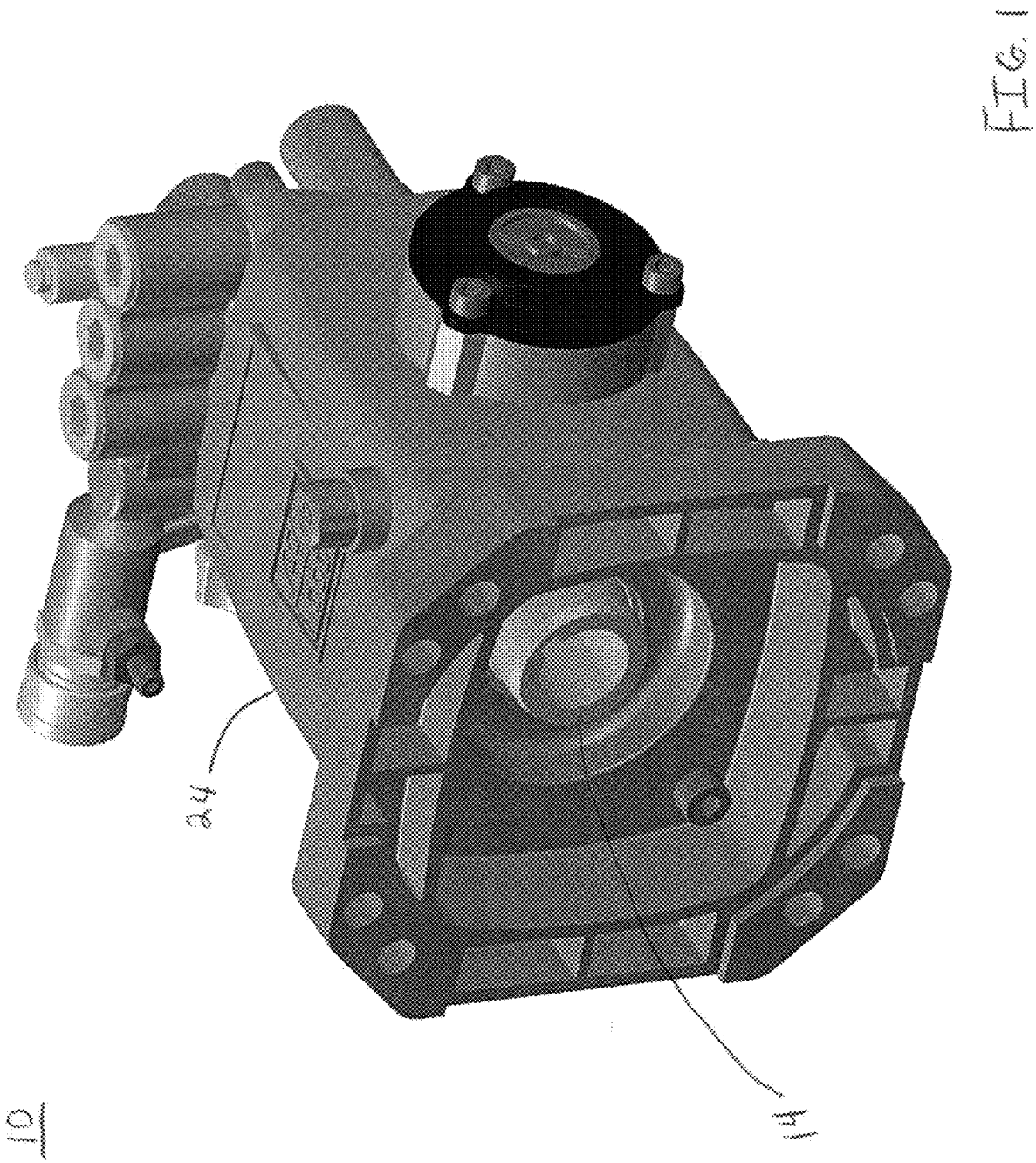
FIG. 1 depicts an illustrative example of a pump, consistent with an example embodiment.

In general, the present disclosure may provide a pump that is configured to dynamically lubricate one or more bearings, or other features, associated with the pump. That is, during operation, the movement of one or more components of the pump may impart a dynamic motion on oil within a primary oil reservoir (e.g., that may be used for general lubrication of various components of the pump). The dynamic motion of the oil within the primary oil reservoir may cause and/or facilitate migration of oil through a bearing, and back into the primary oil reservoir. Dynamic lubrication systems consistent with the present disclosure may be used in connection with a wide variety of pumps, and/or any mechanisms including rotating components that are at least partially disposed within an oil reservoir and can impart dynamic motion on the oil within the oil reservoir to cause, facilitate, assist, or encourage dynamic flow of the oil through a bearing. Examples of pumps for which the present disclosure may be used may include, but are not limited to, axial cam piston pumps, crank driven pumps, centrifugal pumps, lobe pumps, gear pumps, and the like. For example, in one illustrative embodiment, the pump may include an axial cam piston pump, e.g., which may be used in connection with a pressure washer, or other pumping applications. The cam plate of the axial piston pump may be rotationally driven by an input shaft, e.g., which may in turn be driven by a suitable engine (e.g., gasoline, diesel, propane, etc.) or motor. The input shaft (and/or the cam plate itself) may be supported by a main bearing, e.g., which may support the input shaft and/or cam plate for rotation and/or support any thrust loads experienced by the cam plate. The cam plate, and/or at least a portion of the input shaft, may be at least partially located (and/or fully located) within the primary oil reservoir, and may be in contact with the oil in the primary oil reservoir. During operation of the pump, the cam plate and the input shaft may be rotated (e.g., to cause the pumping action). The rotation of the cam plate and/or the input shaft, while in contact with oil within the primary oil reservoir, may impart a dynamic motion on the oil. The dynamic motion may be caused by, for example, frictional interaction between the cam plate and the oil. The dynamic motion imparted to the oil may include a rotational motion of the oil within the primary oil reservoir. The bearing may be retained and/or supported by a bearing support that may be at least partially disposed within the primary oil reservoir. The bearing support may include one or more passages behind the bearing (e.g., distal relative to the cam plate) that may be arranged to allow oil to migrate from the primary oil reservoir, through the bearing, and out of the bearing support through the one or more passages. As such, it may be the dynamic motion of the oil within the primary oil reservoir that may cause and/or facilitate the migration of oil through the bearing.

Consistent with such a configuration, during operation oil may continually migrate and/or flow through the bearing. Accordingly, there may not be a generally fixed volume of oil within the bearing, for example, as may be the case with conventional systems in which there may be limited exchange of oil within the bearing with the oil in the primary oil reservoir. Accordingly, in some embodiments, the continual migration of oil through the bearing consistent with the present disclosure, may act to refresh the oil within the bearing space. As such, the oil within the bearing may be less susceptible to overheating (e.g., due to heat conducted via the input shaft and/or pump housing from the engine and/or due to frictional heat buildup within the bearing itself). This may reduce the breakdown of the oil and the resulting reduction in lubricating characteristics and/or the accumulation of breakdown byproducts, such as carbon and the like. Further, the continual migration of oil through the bearing, during operation of the pump, may aid in transporting any breakdown byproducts from the bearing and into the primary oil reservoir. As such, the breakdown byproducts may be diluted within the volume of oil within the primary oil reservoir, e.g., which may reduce and/or delay any damage caused by the breakdown byproducts and/or may allow the breakdown byproducts to be at least partially removed by regular servicing of the pump, which may include changing the oil within the primary oil reservoir. Various additional and/or alternative features may be realized consistent with the present disclosure.

Figure 2:
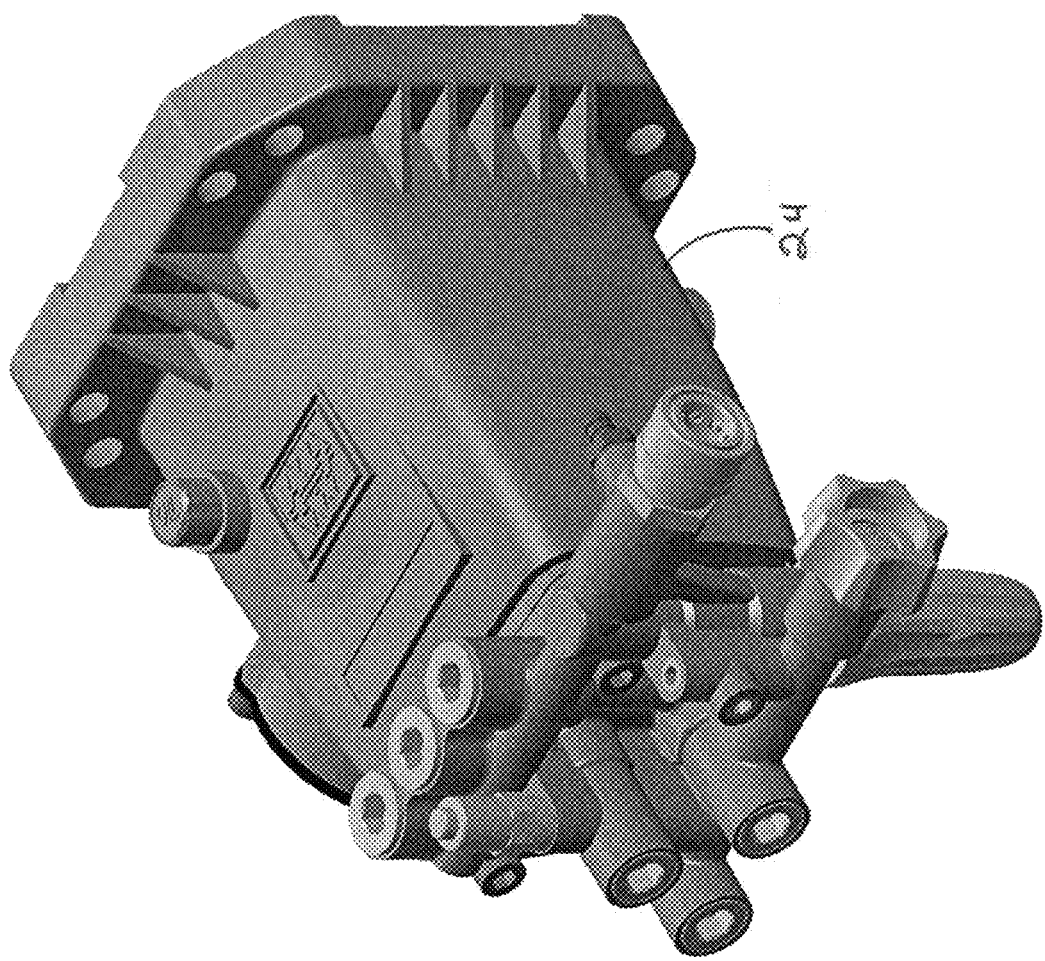
FIG. 2 depicts the pump of FIG. 1 from an alternative vantage.

Referring to FIGS. 1 and 2, an illustrative example embodiment of a pump 10 is generally shown. Consistent with the illustrated example embodiment, the pump 10 may include an axial cam piston pump. For example, and referring also to FIGS. 3 and 4, the pump 10 may include a cam plate 12 and an input shaft 14 for rotationally driving the cam plate 12. The input shaft 14 may be configured to be coupled with an internal combustion engine (e.g., a gasoline engine, a diesel engine, a propane engine, etc.), a motor, or other suitable power plant for rotationally driving the input shaft 14. In various embodiments, the input shaft 14 may be keyed, e.g., as shown in FIG. 1, for rotational coupling with an engine or motor. It will be appreciated that other arrangements for rotational coupling may also be utilized (e.g., splines, bolted flanges, friction fit, etc.) Further, the input shaft 14 may be configured to be coupled with the cam plate 12, such that when the input shaft 14 is rotationally driven by the engine, motor, etc., the input shaft 14 may rotationally drive the cam plate 12. For example, the cam plate 12 and the input shaft 14 may be integrally formed, may be coupled via a keyed coupling, a spline coupling, a friction fit, and/or any other suitable coupling.

Figure 3:
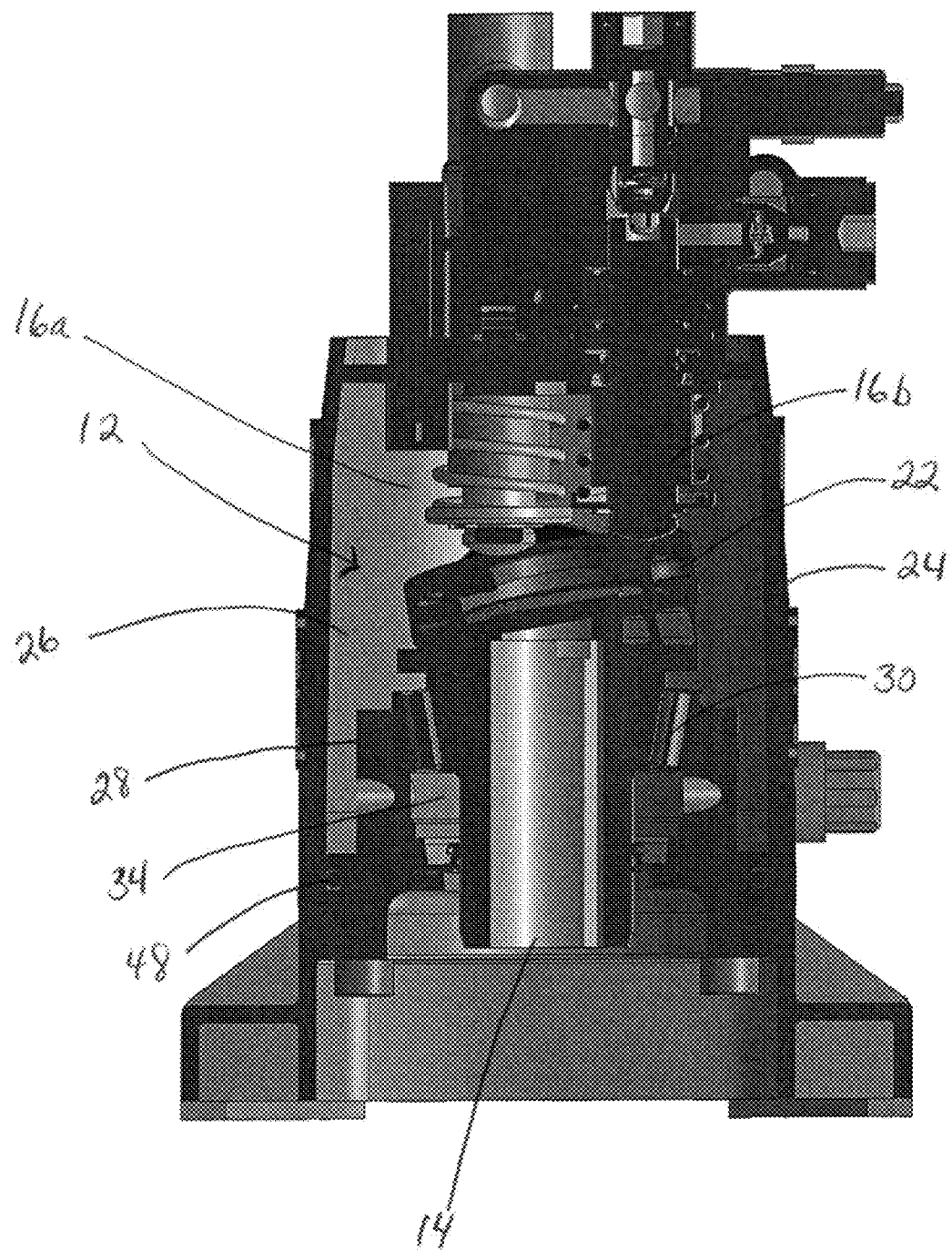
FIG. 3 depicts a cross-sectional view of an illustrative example pump, consistent with an example embodiment.
Figure 4:
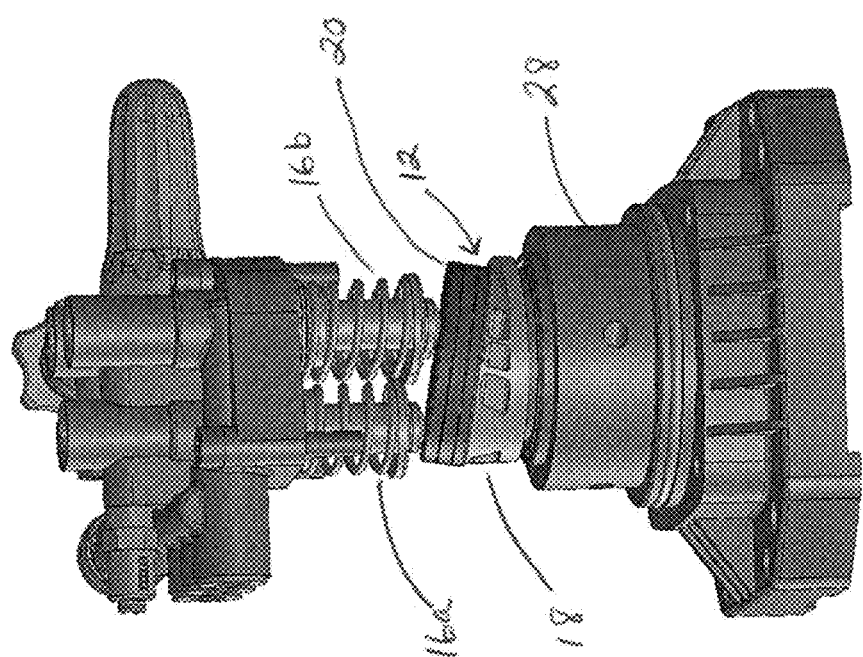
FIG. 4 depicts the illustrative example embodiment of the pump of FIG. 3 with the pump housing removed.
Figure 5:
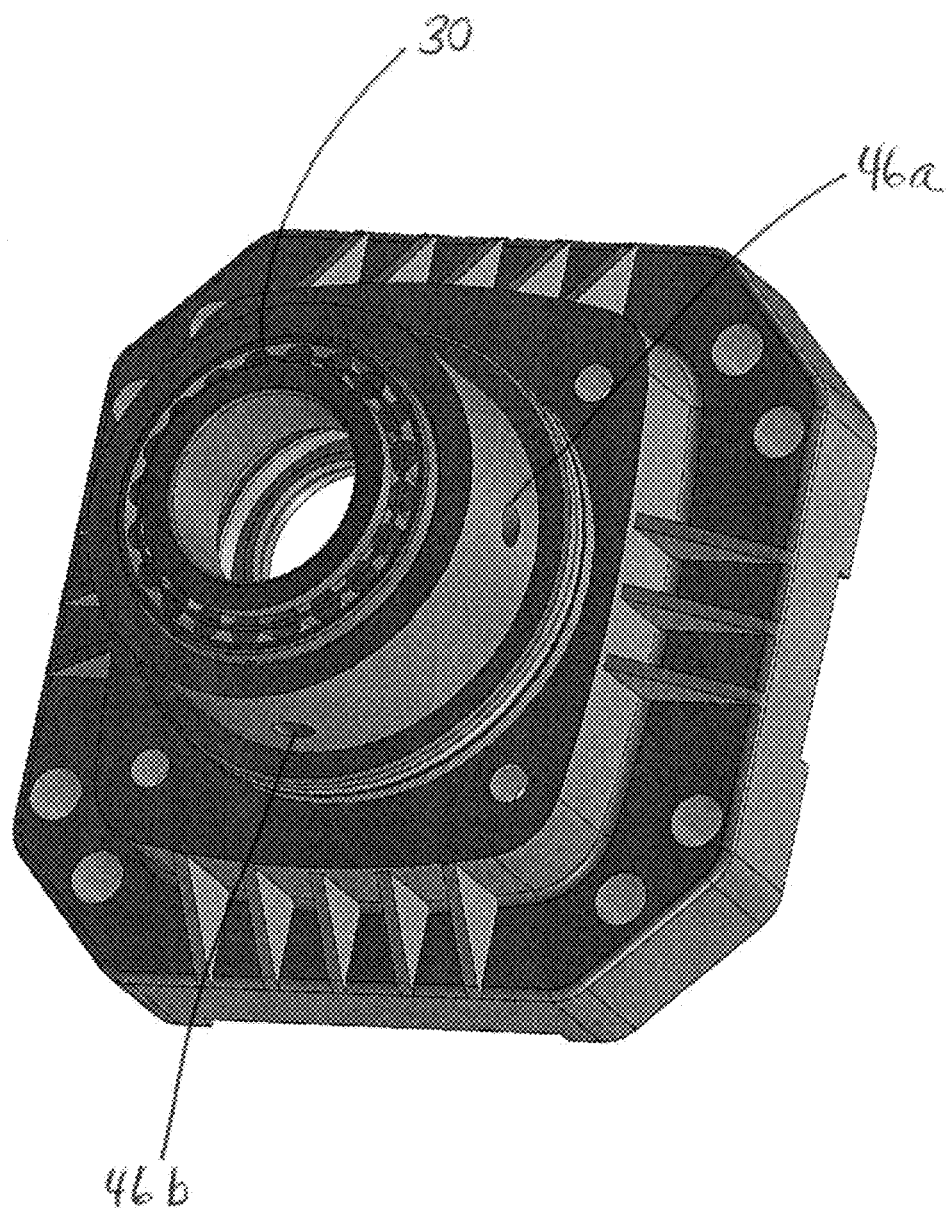
FIG. 5 depicts an illustrative example embodiment of a bearing support, consistent with an example embodiment.

As shown, and as is generally known, the cam plate 12 may be oriented at an angle relative to the longitudinal axis of the input shaft 14 (and, therein, at an angle relative to the rotational axis of the cam plate 12 and drive shaft 14). The angle of the cam plate 12 relative to the longitudinal axis of the input shaft 14 may be any suitable angle greater than perpendicular and less than parallel. As shown, the pump 10 may further include one or more pistons (e.g., pistons 16a, 16b, as well as an additional piston not readily apparent in FIGS. 3 and 4), which may be radially spaced around the longitudinal axis of the input shaft 14 (and therein, also radially spaced around the axis of rotation of the cam plate 12). While the illustrative example embodiment is generally depicted and described as including three pistons, it will be appreciated that suitable pumps may include one or more pistons depending upon various design considerations. Consistent with the foregoing, the angled arrangement of the cam plate 12 relative to the longitudinal axis of the input shaft 14 may be such that rotation of the cam plate 12 (as a result of rotation of the input shaft 14) may reciprocatingly drive the one or more pistons (e.g., within respective bores or cylinders) for pumping a fluid (in association with various additional components, such as inlet and/or outlet valves, as is generally known). In some embodiments, the angle of the cam plate 12 may be variable, i.e., may be capable of being changed, such that an axial travel of the one or more pistons may be varied (e.g., which may vary the pumped volume of each piston for every rotation of the cam plate). In some embodiments, the cam plate 12 may include a multi-component assembly, e.g., including a cam body 18 and a bearing surface 20 (e.g., which may be coupled with the cam body 18 via a bearing, such as a ball bearing, as generally shown in FIG. 3). Such an arrangement, while not necessary, may reduce the frictional interaction between the cam plate 12 and the pistons.

Continuing with the illustrative embodiment, consistent with the present disclosure, the pump 10 may also include a pump housing 24. The pump housing 24 may at least partially surround the cam plate 12, and may define a cam plate oil reservoir 26 around at least a portion of the cam plate 12. As shown, the pump housing 24 may also generally surround the one or more pistons 16a, 16b. The cam plate oil reservoir 26 may generally be configured to contain lubricating oil for the pump 10, e.g., for providing lubrication for one or more of the cam plate/piston interaction and the piston/bore interaction. Additionally, the oil may provide some degree of cooling/heat transfer for the pump 10. In some embodiments, the cam plate oil reservoir 26 may have a generally cylindrical configuration. That is, for example, in some embodiments the pump housing 24 may have an interior surface that has a generally circular cross-sectional shape perpendicular to the axis of rotation of the cam plate 12, in at least the region of the cam plate 12. In some embodiments, the entirety of the cam plate oil reservoir may include a generally cylindrical configuration. In some embodiments, the cam plat oil reservoir may have a different configuration away from the region of the cam plate. In the illustrated example embodiment, as shown in FIG. 3, the cam plate oil reservoir 26 may taper to some degree in the region of the piston bores, although other configurations may be equally utilized.

The pump 10 may further include a bearing support 28. As shown, e.g., in FIG. 3 and FIG. 5-7, the bearing support 28 may be at least partially disposed within the cam plate oil reservoir 26. In an illustrative embodiment consistent with the present disclosure, the bearing support 28 may at least partially support and/or retain a bearing 30. For example, in some embodiments, the bearing support may include a shaft opening 32, generally, that may be configured to receive at least a portion of the input shaft 14 therethrough. In some embodiments consistent with the present disclosure, the bearing 30 may support at least a portion of the input shaft. For example, in the illustrated embodiment, an outer race of the bearing 30 may be disposed in a recess, or cup, formed in an end of the bearing support 28 (e.g., around the periphery of the shaft opening) proximate the cam plate 12. In such an embodiment, the outer race of the bearing 30 may be press fit into the recess, or cup, formed in the shaft opening 32 of the bearing support 28. However, it will be appreciated that other arrangements for supporting and/or retaining the bearing may be utilized As noted above, in some embodiments consistent with the present disclosure, the bearing 30 may support at least a portion of the input shaft 14. For example, and as shown in the illustrated example embodiment, the input shaft 14 may extend through, and be at least partially supported by the bearing 30. In some embodiments, the bearing 30 may support at least a portion of the input shaft 14 for rotation. Further, in some embodiments, the bearing may include a thrust bearing, which may be configured to support axial thrust loads imparted on the cam plate 12. For example, during operation of the pump 10, the cam plate 12 may reciprocatingly drive the one or more pistons (e.g., pistons 16a, 16b, etc.), which may result in thrust loads being imparted on the cam plate 12, generally axial relative to the axis of rotation of the cam plate 12. Consistent with such an embodiment, in addition to supporting the input shaft 14 (and thereby the cam plate 12) for rotation, the bearing 30 may also support axial thrust loads experienced by the cam plate 12 (e.g., supporting the cam plate against axial movement as a result of experienced thrust loads). Consistent with such example embodiments, the bearing 30 may include a suitable bearing, such as a taper roller bearing, a taper needle bearing, and/or any other suitable bearing configuration.

Figure 6:
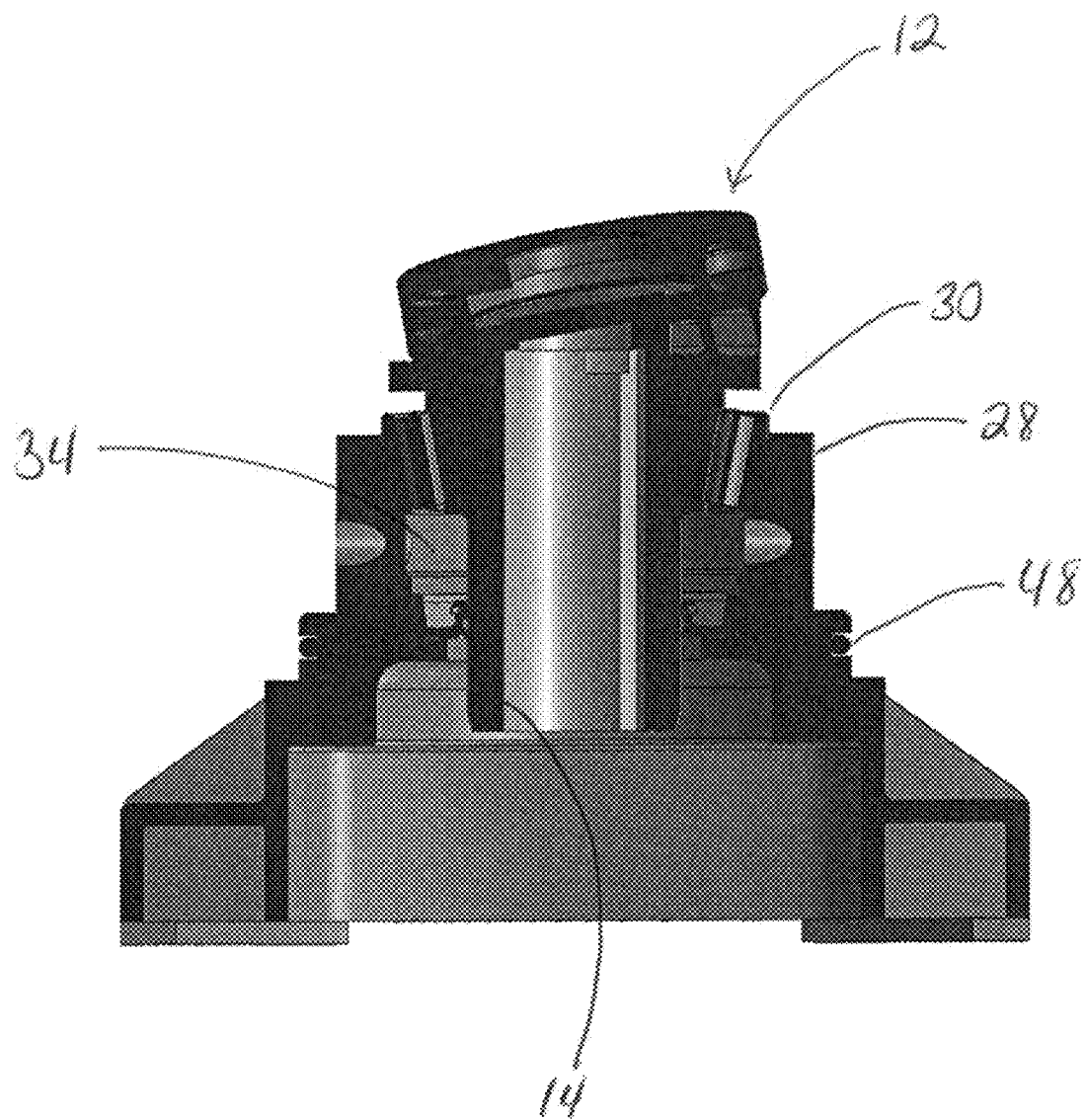
FIG. 6 depicts a cross-sectional view of an illustrative example bearing support, cam plate, and input shaft, consistent with an example embodiment.
Figure 7:
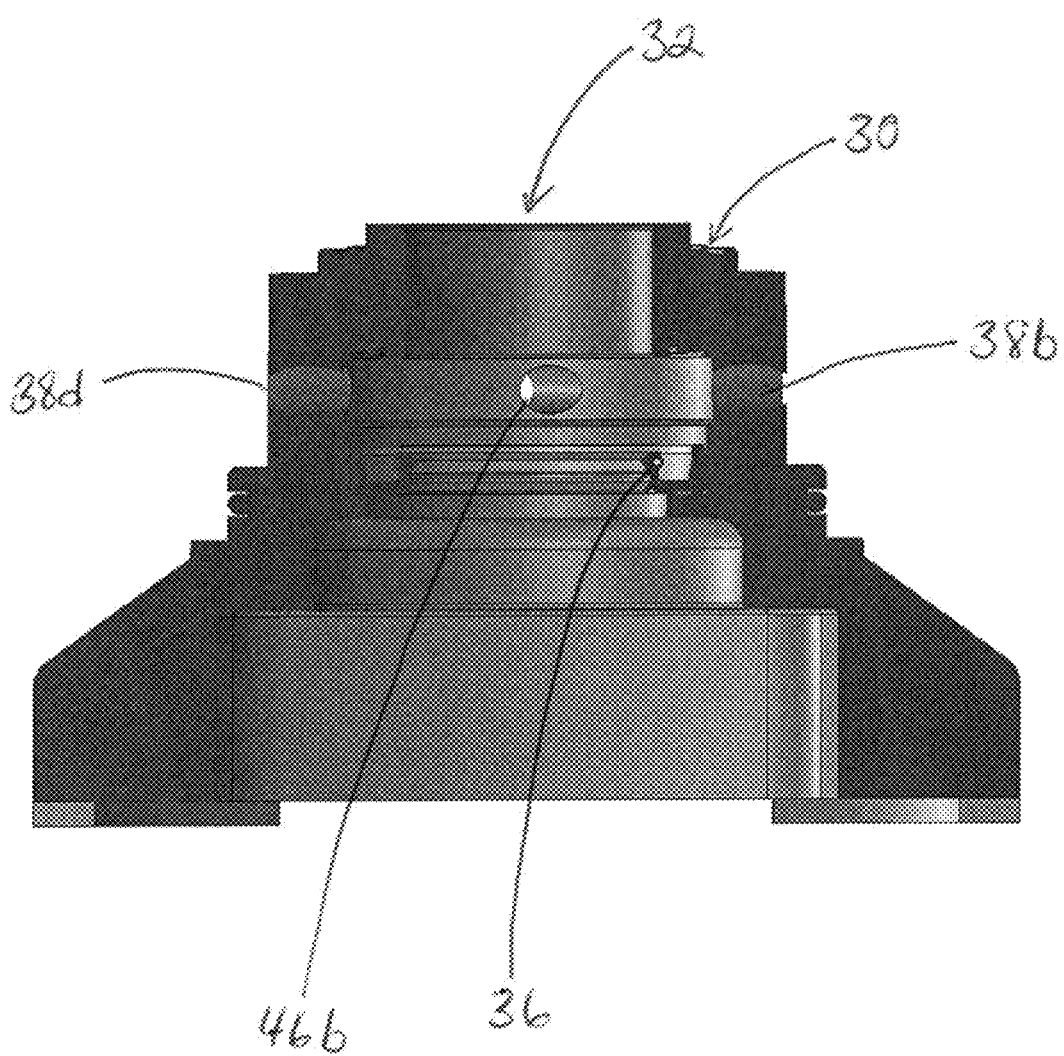
FIG. 7 depicts a cross-sectional view of an illustrative example bearing support, consistent with an example embodiment.

Consistent with some embodiments of the present disclosure, and with particular reference to FIG. 6, the bearing support 28 may define a bearing oil reservoir 34 at least partially surrounding a portion of the input shaft 14. In the illustrated example embodiment, the bearing oil reservoir 34 may be at least partially defined by an input shaft seal 36 that may be spaced from the bearing 30. For example, consistent with typical pump configuration, the main seal may generally be disposed immediately adjacent the bearing, e.g., to prevent oil from the pump migrating through the bearing and leaking from the pump. In some conventional arrangements, the seal may even be in contact with the rear of the bearing (e.g., the side of the bearing opposite the cam plate). Consistent with the present disclosure, in some embodiments, the input shaft seal 36 may be spaced from the bearing 30 to define the bearing oil reservoir 34 between the bearing 30 and the input shaft seal 36. In some embodiments, the region of the bearing support 28 between the bearing 30 and the input shaft seal 36 may be enlarged to increase the size of the bearing oil reservoir 34 (e.g., by providing a greater clearance, or spacing between, an interior portion of the bearing support defining the bearing oil reservoir and the input shaft), however such enlargement is not required.

Consistent with the present disclosure, the bearing 30 may be, at least in part, lubricated by oil from the cam plate oil reservoir 26. For example, as generally shown, e.g., in FIG. 3, the bearing 30 may be exposed to the cam plate oil reservoir 26. Consistent with conventional pump configurations, the main seal may be generally located immediately adjacent to the bearing. As such, often there may be minimal exchange of oil within the bearing and oil within the oil reservoir of the pump. Further, the oil within the bearing may be subject to heat (e.g., which may be transferred from an engine driving the pump), frictional heating from rotation of the input shaft, and/or shearing of the oil in the bearing due to the rotation of the input shaft and/or the bearing itself. Such heating and/or shearing may result in degradation and/or breakdown of the oil in the bearing, which may cause, for example, the oil in the bearing to build up breakdown components of the oil (e.g., carbon, metallic wear components, and/or other breakdown components), which may result in thickening (e.g., tarring up of the oil) and/or a decrease in the lubricating performance of the oil within the bearing, as well as chemical attack (e.g., resulting from the heating of the oil and/or the presence of breakdown components) of the oil on some materials, such as the seal. Consistent with the present disclosure, and as will be discussed in greater detail below, a dynamic motion imparted on the oil, as well as the configuration of the pump 10 may facilitate and/or induce migration of oil through the bearing 30, which may reduce heat buildup of oil in the bearing and/or allow breakdown components to be at least partially removed from the bearing. Accordingly, oil within the bearing may be replenished and/or replaced with fresh oil from the cam plate oil reservoir 26. The replenishment and/or replacement of oil in the bearing may reduce the magnitude of heat buildup in the bearing and/or remove at least a portion of the breakdown components from the bearing, e.g., which may allow the breakdown components to be diluted in the volume of oil in the cam plate oil reservoir 26 (e.g., which may also, in some embodiments, allow at least a portion of the breakdown components diluted in the volume of oil within the cam plate oil reservoir to be removed when the oil in the cam plate reservoir is changed during servicing or maintenance of the pump).

Figure 8:
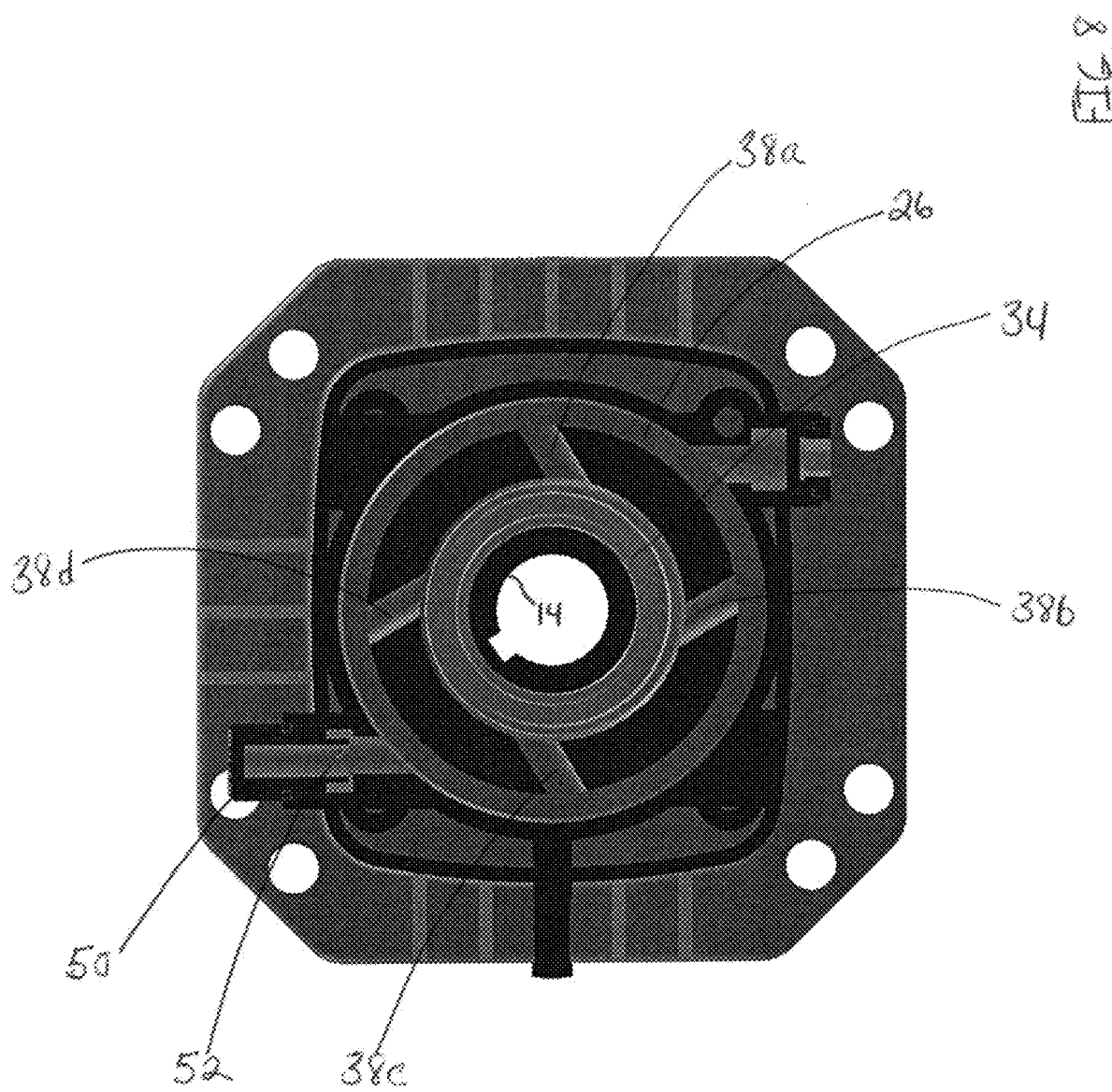
FIG. 8 depicts a cross-sectional view of an illustrative example pump through the bearing oil reservoir and the one or more passages, consistent with an example embodiment.

Consistent with the foregoing, in some embodiments, the pump 10 may include at least one passage extending (e.g., passages 38a, 38b, 38c, 38d) between the bearing oil reservoir 34 and the cam plate oil reservoir 26, e.g., as shown in FIG. 8. While the illustrated example embodiment depicts four passages, a greater or fewer number of passages may be included (e.g., one or more passages). As shown, consistent with some embodiments of the present disclosure, the at least one passage may extend between the bearing oil reservoir 34 and the cam plate oil reservoir 26 in a portion of the bearing support 28 between the bearing 30 and the input shaft seal 36. Consistent with the present disclosure, the at least one passage (e.g., passages 38a, 38b, 38c, 38d) may be configured such that a dynamic motion imparted on oil within the cam plate oil reservoir 26 facilitates migration of oil from the cam plate oil reservoir 26 through a bearing 30 at least partially supported by the bearing support 28 into the bearing oil reservoir 34 and through the at least one passage 38a, 38b, 38c, 38d into the cam plate oil reservoir 26. As such, the bearing may experience dynamic lubrication, in which oil from the cam plate oil reservoir 26 passes through the bearing into the bearing oil reservoir 34 and back into the cam plate oil reservoir 26. The dynamic lubrication of the bearing may, as generally discussed above, reduce heat buildup within the bearing, remove breakdown components and/or metallic wear components within the bearing, and/or replace oil within the bearing that may have a degraded lubricating capacity with new oil from the cam plate oil reservoir.

Continuing with the foregoing, the dynamic motion of the oil within the cam plate oil reservoir 26 may result, at least in part, from the rotation of the cam plate 12 within the cam plate oil reservoir 26. For example, the cam plate 12 may be at least partially disposed within the oil contained within the cam plate oil reservoir 26. When the cam plate 12 is rotationally driven during operation of the pump 10, the cam plate 12 may interact with the oil within the cam plate oil reservoir 26 and may impart a dynamic motion on the oil (e.g., based upon, at least in part, frictional and/or drag interactions of the cam plate moving within the oil). Consistent with some embodiments, the dynamic motion imparted on the oil by the cam plate 12 may include a rotational motion of the oil within the cam plate oil reservoir 26. For example, the oil may be cause to rotate and/or swirl around the interior of the cam plate oil reservoir 26 as a result of rotational energy imparted on the oil by the rotating cam plate 12. In such an embodiment, the rotation of the oil within the cam plate oil reservoir may be in the same direction as the rotation of the cam plate 12. It will be appreciated that while the dynamic motion of the oil may include rotational motion, the dynamic motion may include other components as well (e.g., the dynamic motion may not be exclusively rotational).

In some embodiments, the cam plate 12 may include one or more features that may facilitate imparting dynamic motion on the oil within the cam plate oil reservoir 26 as a result of rotation of the cam plate 12. For example, and referring to FIG. 9, the one or more features may include one or more of a recess (e.g., recesses 40a, 40b, 40c) in an exterior surface of the cam plate 12. Consistent with the illustrated example embodiment, the recesses 40a, 40b, 40c may increase the frication and/or drag interactions between the cam plate 12 and the oil, which may facilitate and/or increase the ability, rate, or magnitude with which the cam plate 12 may impart dynamic motion on the oil. While three recesses are shown in the illustrated example embodiment, it will be appreciated that a greater or fewer number or recesses may be utilized. In addition/as an alternative to recesses, the cam plate may include other features that may facilitate imparting dynamic motion on the oil by the cam plate, such as, but not limited to, one or more fin on the exterior surface of the cam plate, one or more passages through at least a portion of the cam plate, one or more protrusions from a portion of the exterior surface of the cam plate, or the like.

As discussed above, in some embodiments consistent with the present disclosure, at least a portion of the bearing support 28 may disposed within the cam plate oil reservoir 26. Further, the one or more passages (e.g., passages 38a, 38b, 38c, 38d) may extend between the bearing oil reservoir 34 and the cam plate oil reservoir 26. Further, a dynamic motion imparted on the oil within the cam plate oil reservoir 26 by the rotation of the cam plate 12 may cause and/or facilitate migration and/or flow of oil from the cam plate oil reservoir 26, through the bearing 30 into the bearing oil reservoir 34, and from the bearing oil reservoir 34 through one or more passages (e.g., passages 38a, 38b, 38c, 38d) back into the cam plate oil reservoir 26.

Without intending to be limited to any particular theory or principle of operation, one, or a combination of mechanism may cause, assist, and/or facilitate the dynamic lubrication of the bearing. For example, in some implementations, during operation, the pump 10 may be generally oriented in a horizontal position (i.e., the axis of the input shaft and the axis of rotation of the cam plate may be generally horizontal). It should be noted that the designator "horizontal" position is not intended to limit an operational position of the pump, but rather to differential from a generally vertical position, with up to a 45 degree variation from strictly horizontal being encompassed by the designation. With reference also to FIG. 10, an illustrative example static oil level 42 (e.g., an oil level when no dynamic motion is imparted to the oil), and an illustrative example dynamic oil level 44 (e.g., an oil level when dynamic motion is imparted to the oil) are generally shown. It should be understood that the depicted oil level are meant to be illustrative and not limiting. As depicted, the dynamic oil level 44 may be at least at the lower height of the bearing 30 (e.g., by reference to the generally horizontal position of the pump). As such, during operation of the pump 10 (i.e., when dynamic motion is imparted to the oil), the dynamic oil level 44 may allow oil to migrate from the cam plate oil reservoir 26 into the bearing 30. It will be appreciated that the cohesive and/or adhesive characteristics of the oil may cause at least a portion of the oil to be transferred around the diameter of the bearing 30. Further, when the pump 10 is in an orientation such that at least one passage (e.g., passage 38c in FIG. 10) is below the dynamic oil level 44, oil entering through the bearing 30 may drain back into the cam plate oil reservoir 26.

According to an additional and/or alternative, and non-limiting, possible mechanism of operation, rotational dynamic motion imparted to the oil by the rotating cam plate 12 may impart a centrifugal force on the oil, pushing at least a portion of the oil to an interior wall of the pump housing 24, defining the cam plate oil reservoir 26. The centrifugal force driving the oil toward the interior wall of the pump housing 24 may additionally result in a longitudinal force (i.e., a force generally parallel to the rotational axis of the cam plate, and thereby a rotational axis of the oil) being imparted on the oil, e.g., as the oil is pushed toward the interior wall of the pump housing 24 by the centrifugal force and flows longitudinally. As the dynamic oil level 44 of the oil within the cam plate reservoir 26 may be at least at the bearing 30, a longitudinal force imparted on the oil (e.g., as a result, at least in part, of the centrifugal force imparted on the oil) may cause and/or facilitate migration of the oil through the bearing 30. Oil migrating through the bearing 30 into the bearing oil reservoir 34 may exit via one or more of the passages (e.g., passages 38a, 38b, 38c, 38d).

Consistent with the foregoing possible mechanism of operation, in some implementations, centrifugal force imparted on the oil may result in a radial dynamic oil level around at least a portion and/or the entirety of the interior wall of the pump housing 24 (e.g., in which the dynamic oil level defines a "thickness" of the body of oil around the interior wall of the pump housing 24). In some such embodiments, an entire circumference of bearing may be covered by oil, and oil may be pushed in around the entire circumference of the bearing, e.g., by a longitudinal force imparted on the oil as the oil is pushed toward the interior wall of the pump housing by the centrifugal force imparted on the oil. In a similar manner as discussed above, oil migrating through the bearing 30 into the bearing oil reservoir 34 may exit via one or more of the passages (e.g., passages 38a, 38b, 38c, 38d).

According to an additional and/or alternative mechanism, the rotating and/or swirling oil within the cam plate reservoir 26 may rotation around at least a portion of the bearing support 28. In some such embodiments, and as generally shown in, e.g., FIGS. 5 and 8, at least a portion of the bearing support 28 within the cam plate oil reservoir 26 may have a generally cylindrical exterior configuration. That is, for example, at least a portion of the exterior of the bearing support may have a generally circular cross-section perpendicular to the axis of rotation of the cam plate 12 (e.g., and thereby perpendicular to an axis of rotation of oil within the cam plate oil reservoir 26). Consistent with some such implementations, at least the generally cylindrical exterior configuration of the bearing support 28 may present a relatively low disruption of the dynamic motion of the oil within the cam plate oil reservoir flowing over the portion of the bearing support (e.g., as compared to at least some alternative cross-sectional profiles).

Consistent with the foregoing, in some implementations, and with additional reference to FIG. 11, the rotating and/or swirling oil within the cam plate oil reservoir 26 may rotate past a respective opening (e.g., openings 46a, 46b depicted, e.g., in FIG. 5) of the one or more passages (passages 38a, 38b, 38c, 38d). In some embodiments, the oil rotating past the respective openings of the one or more passages may create a slip stream, e.g., which may facilitate and/or cause migration of oil from the bearing oil reservoir 34, through one or more of the passages, and back into the cam plate oil reservoir. In some embodiments, the at least one passage may be oriented at a non-radial angle relative to a longitudinal axis of the input shaft. For example, as shown, e.g., in FIGS. 8 and 11, the one or more passages (e.g., passages 38a, 38b, 38c, 38d) may extend through the bearing support 28 at an angle that does not intersect the longitudinal axis of the input shaft 14 and/or a center of the bearing oil reservoir 34. The orientation of the passage may, but need not, be tangential to the bearing oil reservoir 34. In some such embodiments, the orientation of the one or more passages may facilitate creating a slipstream past the openings of the one or more passages. As generally discussed above, the dynamic motion imparted on the oil within the cam plate oil reservoir 26 may include a rotational motion of the oil within the cam plate oil reservoir 26. In some such embodiments, and with particular reference to FIG. 11, the at least one passage may be oriented at an angle in the direction of the rotational motion of the oil (indicated by arrow 48 in FIG. 11) within the cam plate oil reservoir.

Consistent with the foregoing, in some such embodiments, the orientation of the one or more passages may, e.g., reduce the occurrence of oil from the cam plate oil reservoir being scooped into the one or more passages. Additionally/alternatively, in some embodiments the cohesive character of the oil may facilitate migration of oil through the one or more passages into the cam plate oil reservoir 26. For example, oil within the one or more passages may attach to the stream of rotating oil flowing past the respective openings of the one or more passages, and may be drawn from the one or more passages into the cam plate oil reservoir 26. In some implementations, oil within the bearing oil reservoir 34 may similarly attach to oil within the one or more passages, and may similarly be drawn through the one or more passages into the cam plate oil reservoir 26. Further, in some embodiments, the drawing of oil from the one or more passages and/or the bearing oil reservoir 34 may create a lower pressure within the bearing oil reservoir, e.g., which may facilitate, assist, and/or cause oil migrate from the cam plate oil reservoir 26 through the bearing.

According to an additional and/or alternative mechanism, the migration of oil through the bearing 30 into the bearing oil reservoir 34, and from the oil bearing reservoir 34 through the one or more passages back into the cam plate oil reservoir 26 may be caused, assisted, and/or facilitated by the flow of rotating oil in the cam plate oil reservoir 26 creating a reduced pressure in the vicinity of the respective openings of one or more passage, with or without cohesive attachment of oil within the one or more passages to the flow of oil past the respective openings. For example, the dynamic flow of oil across the respective openings may, alone (and/or in combination with other mechanisms), induce a reduced pressure in the vicinity of the respective openings. In some such embodiments, the reduced pressure in the vicinity of the respective openings may one or more of cause, assist, and/or facilitate migration of oil from the bearing oil reservoir 34 through the one or more passages, and into the cam plate oil reservoir 26, and cause, assist, and/or facilitate migration of oil from the cam plate oil reservoir 26 through the bearing 30.

In some embodiments, an exterior surface of the bearing support 28 may include a flow disrupter at a leading edge, relative to a direction of rotation of the oil, of an opening of the at least one passage on the exterior surface of the bearing support. The flow disrupter may cause and/or assist in inducing a reduced pressure in the vicinity of the opening of the at least one passage. For example, the flow disrupter may change the speed of the rotating oil within the cam plate oil reservoir as it flows over the opening of the at least one passage. Additionally/alternatively, the flow disrupter may create eddies and/or turbulence in the rotating oil as it flows over the opening of the at least one passage. Such disturbances in the flow of the dynamically rotating oil over the opening of the at least one passage may cause, facilitate, and/or assist in inducing a reduced pressure in the vicinity of the opening of the at least one passage, which may, as discussed above, may one or more of cause, facilitate, and/or assist in migration of oil from the bearing oil reservoir 34 through the one or more passages, and into the cam plate oil reservoir 26, and cause, assist, and/or facilitate migration of oil from the cam plate oil reservoir 26 through the bearing 30.

Figure 12C:
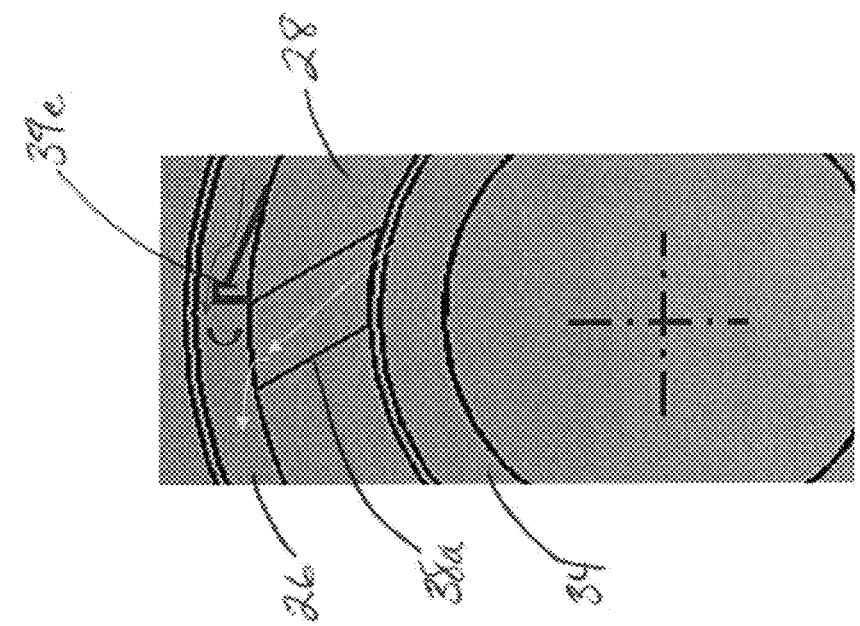
FIGS. 12A-12C diagrammatically depict illustrative examples of flow disruptors, consistent with some example embodiments.
Figure 12B:
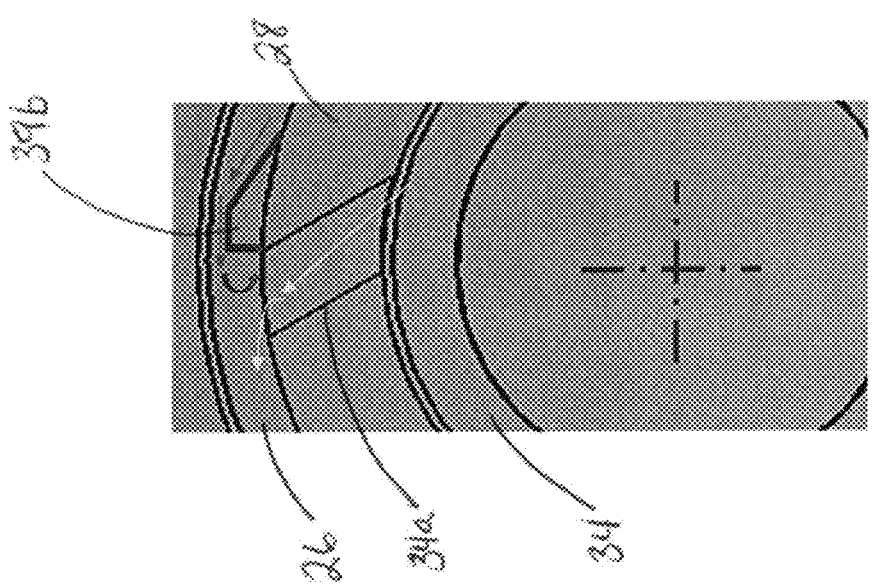
Figure 12A:
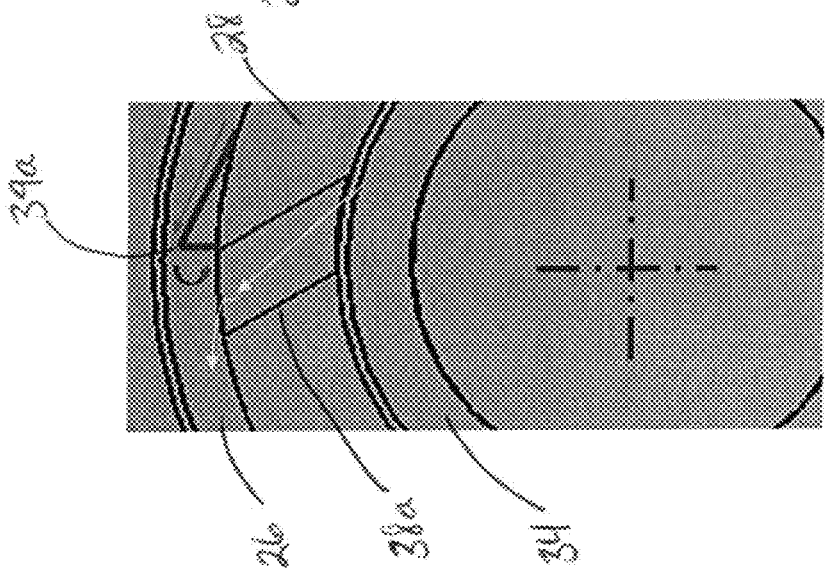

The flow disrupter may include one or more of a bump, a lip, and a protrusion. For example, and referring to FIGS. 12A-12C illustrative example embodiments of flow disrupters are depicted. Referring to FIG. 12A, a first illustrative example embodiment of a flow disrupter 39a is depicted having a general ramp configuration extending from an exterior of the bearing support 28 into the cam plate oil reservoir 26. Referring to FIG. 12B, a second illustrative example embodiment of a flow disrupter 39b is depicted having a general ramp configuration with a generally flat land proximate the opening of the passage 38a (e.g., as compared to the peak or lip depicted with respect to the first illustrative example flow disrupter 39a). Referring to FIG. 12C, a third illustrative example embodiment of a flow disrupter 39c is depicted having a general ramp configuration having a step proximate the opening of the passage 38a.

As shown, and as generally described above, for a generally counterclockwise rotational motion of the oil within the cam plate oil reservoir 26, the flow disrupter (e.g., flow disrupter 39a, 39b, 39c) may be generally positioned on the right hand side of the opening of a passage (e.g., passage 38a) between the bearing oil reservoir 34 and the cam plate oil reservoir 26. As generally depicted in the figures, the flow disrupters 39a, 39b, 39c may each create turbulence in the flow of oil at the opening of the passage 38a into the cam plate oil reservoir 26. The turbulence created by the flow disrupters 39a, 39b, 39c may create a reduced pressure adjacent (e.g. above and/or over) the opening of the passage 38a, which may cause, facilitate, and/or assist the migration of oil from the bearing oil reservoir 34, through the passage 38a, and into the slip stream of the dynamically moving oil within the cam plate oil reservoir 26 (e.g., as generally depicted by the arrows in FIGS. 12A-12C). In some example embodiments, the height of the flow disrupter may be on the order of the diameter of the at least one passage. However, it will be appreciated that other flow disrupter heights may equally be utilized.

It will be appreciated that various additional and/or alternative flow disrupter configurations may be utilized for generating a region of reduced pressure adjacent to and/or above the opening of the one or more passages into the cam plate oil reservoir. Further, it will be appreciated that the relative dimensions and/or proportions of the flow disrupter may be varied depending upon the configuration of the flow disrupter, the desired pressure reduction, and/or other design criteria. For example, certain flow disrupter configurations may provide desirable performance at different dimensions and/or proportions than other flow disrupter configurations. Accordingly, the illustrated implementations should not be construed as a limitation on either the configuration of possible flow disrupters, nor on the dimensions or proportions of possible flow disrupters.

Consistent with some implementations, rotation of the input shaft 14 within the bearing oil reservoir 34 may impart a dynamic rotational motion on oil within the bearing oil reservoir 34, e.g., in a generally similar manner as discussed with respect to the cam plate 12 imparting a dynamic rotational motion on oil within the cam plate oil reservoir 26. In some implementations, the dynamic rotational motion of oil within the bearing oil reservoir 34 may, at least in part, cause, facilitate, and/or assist in the migration of oil through the bearing 30 and/or in the migration of oil from the bearing oil reservoir 34, through the one or more passages, and into the cam plate oil reservoir 26. Still without intending to being limited to a specific mechanism or theory of operation, in a similar manner as discussed above, dynamic rotation of oil within the bearing oil reservoir 34 may impart a centrifugal force on the oil within the bearing oil reservoir, e.g., which may cause and/or facilitate the migration of oil to the wall of the bearing support 28 defining the bearing oil reservoir 34. Additionally, the centrifugal force on the oil within the bearing oil reservoir may cause, facilitate, and/or assist in the migration of oil through the one or more passages (e.g., at least in part caused by the centrifugal force on the oil) and into the cam plate oil reservoir 26. In some such embodiments, the bearing oil reservoir 34 may have a generally cylindrical configuration, e.g., which may facilitate dynamic rotational motion of oil within the bearing oil reservoir 34. For example, the interior of the bearing oil reservoir 34 may have a generally circular cross-section perpendicular to the axis of rotation of the input shaft 14, and therein perpendicular to the dynamic rotation motion imparted on the oil within the bearing oil reservoir 34.

As noted above, in some implementations, the orientation of the one or more passages may facilitate the flow of oil within the cam plate oil reservoir 26 past the respective openings of the one or more passages, e.g., while reducing the occurrence and/or magnitude with which the oil may be scooped into the one or more passages. With reference to FIG. 11, in some implementations, the one or more passages may be generally swept in the direction of dynamic rotation of oil within the bearing oil reservoir 34. In such an implementation, the angled orientation of the one or more passages may cause, facilitate, and/or assist in the migration of oil from the bearing oil reservoir 34, through the one or more passages, and into the cam plate oil reservoir 26. For example, as the orientation of the one or more passages may be swept in the direction of dynamic rotation of the oil within the bearing oil reservoir 34, as the oil flows across an interior opening of the one or more passages the centrifugal force experiences by the oil may cause, facilitate, and/or assist in the migration of oil through the one or more passages to the cam plate oil reservoir 26. Additionally and/or alternatively, the orientation of the one or more passages may tend to scoop the dynamically rotating oil within the bearing oil reservoir 34 to cause, facilitate, and/or assist in the migration of the oil through the one or more passages to the cam plate oil reservoir 26.

In some implementations, the proximity of a bottom surface of the cam plate 12 relative to the adjacent surface of the bearing 30 may create some degree of hydraulic pressure. In some embodiments, the positive hydraulic pressure between the bottom surface of the cam plate 12 and the bearing 30 may cause, facilitate, and/or assist in the migration of oil from the cam plate oil reservoir 26 through the bearing 30.

Consistent with some embodiments, and as shown, for example, in FIGS. 3 and 6 of the illustrated example embodiment, the bearing support 28 may include a seal, such as an O-ring 48, which may be configured to sealingly engage an inner surface of pump housing 24. In some such embodiments, the sealing engagement between at least a portion of bearing support 28 and the pump housing 24 may at least partially enclose and/or define the cam plate oil reservoir 26. It will be appreciated that other configuration may equally be utilized.

In some implementations, the dynamic motion of oil within the cam plate oil reservoir 26 may additionally and/or alternatively be utilized to reduce the leakage and/or migration of oil out of the pump 10 through a breather or fill cap. For example, and referring also to FIG. 8, pump 10 may include an oil fill/breather cap 50, and an oil fill passage 52 into the cam plate oil reservoir 28. As is generally understood, the oil fill passage 52 and the oil fill/breather cap 52 may allow oil to be added to the pump 10 (e.g., by adding the oil into the cam plate oil reservoir 26), and/or allow the venting of any built up pressure within the cam plate oil reservoir 26. Consistent with the illustrated example embodiment, the oil fill passage 52 may be located and/or oriented with respect to dynamic motion that may be imparted on the oil within the cam plate oil reservoir 26 to reduce and/or prevent the leakage and/or migration of oil from the oil fill/breather cap 50. As shown in FIG. 8, the oil fill passage 52 may be oriented at a non-radial angle relative to an axis of rotation of the cam plate. While not required, in some embodiments, the oil fill passage 52 may oriented generally tangentially to an interior of the cam plate oil reservoir 26. Further, in some implementations, the oil fill passage 52 may be located on the pump 10 so as to be positioned to reside on a receding flow of the dynamically rotating oil within the cam plate oil reservoir 26, e.g., in which the dynamically rotating oil may generally be rotating in a counterclockwise direction in FIG. 8. Consistent with the foregoing, the dynamic rotational motion of the oil within the cam plate oil reservoir 26 may reduce the migration of oil into the oil fill passage 52, and reduce any resulting leakage of oil from the oil fill/breather cap 50.

With additional reference to FIGS. 13A and 13B, according to an implementation, a pump 10 may include a pump body (e.g., as generally shown as pump housing in FIGS. 1 and 2) and a pump mounting flange 54 configured to mount the pump 10 to an engine flange (e.g., engine flange 56) including four clocked mounting holes (e.g., mounting holes 58a, 58b, 58c, 58d). The pump mounting flange 54 may include a first set of four mounting holes (e.g., 60a, 60b, 60c, 60d) corresponding to the four clocked mounting holes in a first orientation (e.g., in the orientation shown in FIG. 13B). The pump mounting flange 54 may also include a second set of four mounting holes (62a, 62b, 62c, 62d) corresponding to the four clocked mounting holes in a second orientation (e.g., flipped about horizontal centerline 64). It should be appreciated that, while the foregoing features are shown in connection with pump 10, mounting arrangements consistent with the present disclosure may be equally utilized in connection with pumps that may not include dynamic lubrication systems as described above.

As generally shown above, the four clocked mounting holes (e.g., 58a, 58b, 58c, 58d) define an asymmetrical arrangement, e.g., about horizontal centerline 64. For example, while the four clocked mounting holes 58a, 58b, 58c, 58d may lie on a common mounting circle (e.g., mounting circle (e.g., mounting circle 66 concentric about an output shaft of a motor associated with engine mounting flange 56), with two of the four clocked mounting holes (e.g., mounting holes 58a, 58b) having a first angular spacing relative to a centerline of the mounting circle (e.g., vertical centerline 68) and two of the four clocked mounting holes (e.g., mounting holes 58c, 58d) having a second angular pacing relative to the centerline 68 of the mounting circle 66.

For example, as depicted in the illustrated embodiment of FIG. 13B, the first angular spacing may be different than the second angular spacing. In an example embodiment, the first angular spacing may be about 30 degrees, and the second angular spacing may be about 45 degrees. Consistent with the foregoing, the first set of mounting holes 60a, 60b, 60c, 60d, and the second set of mounting holes 62a, 62b, 62c, 62d may provide a symmetrical pattern across a centerline of an input shaft (not shown) of the pump. For example, the first set of mounting holes and the second set of mounting holes may be symmetrical across horizontal centerline 70 and/or vertical centerline 72.

Consistent with the foregoing arrangement, the engine mounting flange may be clocked (e.g., non-symmetrical), for example to enforce a particular mounting position (and/or to prevent an incorrect mounting arrangement). However, depending upon the engine configuration (e.g., positioning of intake and exhaust components, design preference, etc.), the clocked mounting holes may generally have either of two relationships relative to an up-direction of the engine (e.g., an intended operating orientation of the engine). In some embodiments, a pump may require a particular orientation for correct operation, and as such, the pump may not be susceptible to use with some engine configurations (e.g., in which the engine mounting flange may be clocked opposite to what may be required for correct operation of the pump). For example, the pump may include features such as oil breathers (e.g., pump housing vents), drains, or the like that may require a particular orientation for proper and/or intended operation of the pump. Consistent with embodiments of the present disclosure, the pump mounting flange 54 may provide a symmetrical bolt hole arrangement (e.g., via the two sets of four mounting holes), which may allow the pump to be mounted to an engine have either of two mutually exclusive clocking orientations. As such, the mounting flange consistent with embodiments of the present disclosure may allow for a greater diversity of power plant selection for driving the pump, as either of the two conventional clocking orientations of the engine mounting flange may be utilized while still maintaining a proper operating orientation of the pump.

While the present disclosure has generally been described in the context of a pump assembly for a pressure washer, such description has been presented for the purpose of illustration. It will be appreciated that a pump assembly consistent with the present disclosure may be utilized for a variety of purposes. As such, the present disclosure is considered to be broadly directed at any pumping application.

A variety of features of the have been described herein. However, it will be appreciated that various additional features and structures may be implemented in connection with a pump according to the present disclosure. Further, additional features and details may be depicted in the figures that may not explicitly be described in the detailed description. However, such features and details should be understood as being included within the scope of the present disclosure. Additionally, the various features described herein may be implemented in a variety of combination and sub-combination, including less than all of the described features, and/or some or all of the described features in combination will additional features not specifically detailed in the present disclosure. As such, the features and attributes described herein should not be construed as a limitation on the present disclosure.

What is claimed is:

1. A pump comprising:
a pump body defining an oil reservoir;
an oil fill passage in fluid communication with the oil reservoir, wherein the oil fill passages is oriented generally tangentially to the oil reservoir; and
a pump mounting flange configured to mount the pump to an engine flange including four clocked mounting holes, the pump mounting flange including a first set of four mounting holes corresponding to the four clocked mounting holes in a first orientation, and a second set of four mounting holes corresponding to the four clocked mounting holes in a second orientation.

2. The pump according to claim 1, wherein the four clocked mounting holes define an asymmetrical arrangement.

3. The pump according to claim 2, wherein the four clocked mounting holes lie on a common mounting circle, with two of the four clocked mounting holes having a first angular spacing relative to a centerline of the mounting circle and two of the four clocked mounting holes having a second angular pacing relative to the centerline of the mounting circle, the first angular spacing being different than the second angular spacing.

4. The pump according to claim 3, wherein the first angular spacing is about 30 degrees, and the second angular spacing is about 45 degrees.

5. The pump according to claim 1, wherein the first set of mounting holes and the second set of mounting holes provide a symmetrical pattern across a centerline of an input shaft of the pump.

6. A pump comprising:
a cam plate configured to be rotationally driven by an input shaft;
a plurality of piston pumps radially spaced around a rotational axis of the cam plate and configured to be reciprocatingly driven by the cam plate;
a housing defining a cavity at least partially containing the cam plate and the plurality of piston pumps;
an oil fill passage in fluid communication with the cavity, and arranged at a non-radial angle relative to an axis of rotation of the cam plate; and
a pump mounting flange configured to mount the pump to an engine flange including four clocked mounting holes, the pump mounting flange including a first set of four mounting holes corresponding to the four clocked mounting holes in a first orientation, and a second set of four mounting holes corresponding to the four clocked mounting holes in a second orientation.

7. The pump according to claim 6, wherein the four clocked mounting holes define an asymmetrical arrangement.

8. The pump according to claim 7, wherein the four clocked mounting holes lie on a common mounting circle, with two of the four clocked mounting holes having a first angular spacing relative to a centerline of the mounting circle and two of the four clocked mounting holes having a second angular pacing relative to the centerline of the mounting circle, the first angular spacing being different than the second angular spacing.

9. The pump according to claim 8, wherein the first angular spacing is about 30 degrees, and the second angular spacing is about 45 degrees.

10. The pump according to claim 9, wherein the first set of mounting holes and the second set of mounting holes provide a symmetrical pattern across a centerline of an input shaft of the pump.

11. The pump according to claim 7, wherein the housing includes a breather, and wherein the first set of mounting holes and the second set of mounting holes are configured to allow the breather to be oriented in a desired position during operation of the pump.

12. A pump comprising:
a housing defining a cavity;
a cam plate and at least one piston pump configured to be axially driven when the cam plate is rotationally driven, the cavity at least partially surrounding the cam plate, the housing including a breather oriented at a non-radial angle relative to an axis of rotation of the cam plate; and
a pump mounting flange configured to mount the pump to an engine flange including four clocked mounting holes, the pump mounting flange including a first set of four mounting holes corresponding to the four clocked mounting holes in a first orientation, and a second set of four mounting holes corresponding to the four clocked mounting holes in a second orientation, wherein the first set of mounting holes and the second set of mounting holes are configured to allow the breather to be oriented in a desired position during operation of the pump.

13. The pump according to claim 12, wherein the four clocked mounting holes define an asymmetrical arrangement.

14. The pump according to claim 13, wherein the four clocked mounting holes lie on a common mounting circle, with two of the four clocked mounting holes having a first angular spacing relative to a centerline of the mounting circle and two of the four clocked mounting holes having a second angular pacing relative to the centerline of the mounting circle, the first angular spacing being different than the second angular spacing.

15. The pump according to claim 14, wherein the first angular spacing is about 30 degrees, and the second angular spacing is about 45 degrees.

16. The pump according to claim 12, wherein the first set of mounting holes and the second set of mounting holes provide a symmetrical pattern across a centerline of an input shaft of the pump.

17. The pump according to claim 12, wherein the cavity further defines an oil reservoir.

18. The pump according to claim 17, wherein the breather is in fluid communication with the oil reservoir.

19. The pump according to claim 18, wherein the breather is at least partially defined by an oil fill cap.

* * * * *